United States Patent
Wang et al.

(10) Patent No.: US 11,765,686 B2
(45) Date of Patent: Sep. 19, 2023

(54) PACKET TRANSMISSION METHOD AND APPARATUS FOR COMMUNICATING BETWEEN TERMINALS OF A SAME 5G LAN GROUP

(71) Applicant: HUAWEI TECHNOLOGIES CO., LTD., Shenzhen (CN)

(72) Inventors: Yuan Wang, Shanghai (CN); Zhongping Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 17/224,339

(22) Filed: Apr. 7, 2021

(65) Prior Publication Data

US 2021/0227492 A1 Jul. 22, 2021

Related U.S. Application Data

(63) Continuation of application No. PCT/CN2019/110126, filed on Oct. 9, 2019.

(30) Foreign Application Priority Data

Oct. 9, 2018 (CN) .......................... 201811174580.0

(51) Int. Cl.
*H04W 68/00* (2009.01)
*H04L 67/14* (2022.01)

(52) U.S. Cl.
CPC ............. *H04W 68/00* (2013.01); *H04L 67/14* (2013.01)

(58) Field of Classification Search
CPC ..... H04L 67/14; H04L 45/42; H04L 12/4633; H04L 45/74; H04W 68/00; H04W 76/11; H04W 76/40; H04W 8/26
See application file for complete search history.

(56) References Cited

U.S. PATENT DOCUMENTS

2017/0288972 A1* 10/2017 Li .......................... H04L 41/20
2018/0041465 A1* 2/2018 Kim ................... H04L 12/4604
(Continued)

FOREIGN PATENT DOCUMENTS

| CN | 106465080 A | 2/2017 |
|---|---|---|
| CN | 108366380 A | 8/2018 |

(Continued)

OTHER PUBLICATIONS

"Solution for support of 5G LAN-type service and 5GLAN communication"; SA WG2 Meeting #128-BIS S2-187743 Aug. 20- 24, 2018, Sophia Antipolis, France; Intel (Year: 2018).*

(Continued)

*Primary Examiner* — Benjamin H Elliott, IV

(74) *Attorney, Agent, or Firm* — Rimon PC

(57) ABSTRACT

This application provides a packet transmission method that includes: receiving from a first session management network element, a first message including an address of a first terminal device and an identifier of a first user plane network element servicing the first terminal device; receiving from a second session management network element, a second message including an address of a second terminal device and an identifier of a second user plane network element servicing the second terminal device; determining, that the first terminal device and the second terminal device belong to a same local area network group; sending to the first session management network element the identifier of the second user plane network element and the address of the (Continued)

second terminal device; and sending to the second session management network element the identifier of the first user plane network element and the address of the first terminal device.

14 Claims, 9 Drawing Sheets

(56) References Cited

U.S. PATENT DOCUMENTS

| | | | | |
|---|---|---|---|---|
| 2020/0059977 A1* | 2/2020 | Lai | ................ | H04L 12/4604 |
| 2020/0228936 A1* | 7/2020 | Talebi Fard | .......... | H04W 8/186 |
| 2020/0351984 A1* | 11/2020 | Talebi Fard | .......... | H04W 76/40 |
| 2021/0227492 A1* | 7/2021 | Wang | ................ | H04L 45/42 |
| 2021/0320897 A1* | 10/2021 | Stojanovski | ............ | H04W 4/50 |
| 2021/0409941 A1* | 12/2021 | Rajendran | ............. | H04W 12/06 |

FOREIGN PATENT DOCUMENTS

| | | |
|---|---|---|
| CN | 108370600 A | 8/2018 |
| CN | 108377582 A | 8/2018 |
| KR | 20100070828 A | 6/2010 |
| WO | 2018165934 A1 | 9/2018 |

OTHER PUBLICATIONS

"5G VLAN Ethernet service network architecture (switch mode)"; 3GPP TSG SA WG2 Meeting #128bis S2-187881 Aug. 20-24, 2018, Sophia Antipolis, France; Samsung (Year: 2018).*

"Solution for how to support 5G LAN group communication"; SA WG2 Meeting #128-bis S2-187937 Aug. 20-24, 2018, Sophia Antipolis, France; vivo (Year: 2018).*

WIPO International Search Report (English translation), PCT/CN2019/110126; dated Dec. 27, 2019; retrieved from the internet on Jan. 13, 2023 (Year: 2019).*

"3rd Generation Partnership Project; Technical Specification Group Services and System Aspects; Feasibility Study on LAN Support in 5G (Release 16)",3GPP TR 22.821, V16.1.0, Jun. 23, 2018, pp. 1-52, XP051474074.

Huawei et al: "support for 5GLAN communication key issue", 3GPP Draft; S2-187624_EMAIL_REV2_S2-187554,Jul. 13, 2018, XP051538972, total 4 pages.

Kpn et al: "5G LAN—new CR explanation", 3GPP Draft; S1-182700, Aug. 29, 2018, XP051535108, total 15 pages.

Huawei, HiSilicon, Solution for KI#4 and KI#5: Basic architecture for supporting dynamic 5G LAN-type service and 5GLAN communication. 3GPP TSG-SA WG2 Meeting #128bis, Sophia Antipolis, France, Aug. 20 Aug. 24, 2018, S2-189054, 3 pages.

Huawei, HiSilicon, Solution for KI#4 and KI#5: Basic architecture for supporting dynamic 5G LAN-type service and 5GLAN communication. 3GPP TSG-SA WG2 Meeting #128bis Sophia Antipolis, France, Aug. 20 Aug. 24, 2018, S2-188383, 3 pages.

Huawei, HiSilicon, The mechanism for the 5GS to configure service restriction for a particular 5GLAN group. 3GPP TSG-SA WG2 Meeting #128bis Sophia Antipolis, France, Aug. 20 Aug. 24, 2018, S2-188298, 4 pages.

Chinese Office Action for Application No. 201811174580.0 dated Aug. 27, 2020.

International Search Report for Application No. PCT/CN2019/110126 dated Oct. 9, 2019.

* cited by examiner

PACKET TRANSMISSION METHOD AND APPARATUS FOR COMMUNICATING BETWEEN TERMINALS OF A SAME 5G LAN GROUP

CROSS-REFERENCE TO RELATED APPLICATIONS

This application is a continuation of International Application No. PCT/CN2019/110126, filed on Oct. 9, 2019, which claims priority to Chinese Patent Application No. 201811174580.0, filed on Oct. 9, 2018. The disclosures of the aforementioned applications are hereby incorporated by reference in their entireties.

TECHNICAL FIELD

This application relates to the field of communications technologies, and in particular, to a packet transmission method and apparatus.

BACKGROUND

With development of mobile communications systems, in the 3rd generation partnership project (3GPP) specifications, a project has been officially initiated for requirements of a 5th generation mobile communications (5G) local area network (LAN). The project specifies that a 5G network needs to support a virtual LAN service, that is, the 5G network needs to provide a plurality of types of transmission services for terminal devices belonging to a same 5G LAN group, to ensure communication between the terminal devices within the same 5G LAN group.

It is determined based on characteristics of the LAN service that the LAN service is a service that implements peer-to-peer communication between terminal devices through a 3GPP network and does not require deployment and participation of an external application server. For example, functions such as file sharing and network neighbor discovery between conventional personal computers do not require deployment and participation of an external application server.

A terminal device A and a terminal device B that belong to a same 5G LAN group may communicate with each other across regions or across operator networks. Terminal devices that communicate with each other across regions are connected to different UPFs and terminal devices that belong to different operators may also be connected to different UPFs. How to transmit a data packet between the terminal device A and the terminal device B that belong to the same 5G LAN group in a 5G network without deployment and participation of an external application server is an urgent problem to be resolved.

SUMMARY

This application provides a packet transmission method and apparatus, to transmit a data packet between terminal devices that belong to a same 5G LAN group.

According to a first aspect, this application provides a packet transmission method, including: receiving, by a group management network element, a first message sent by a first session management network element, where the first message includes an address of a first terminal device and an identifier of a first user plane network element that provides a local area network (LAN) service for the first terminal device; receiving, by the group management network element, a second message sent by a second session management network element, where the second message includes an address of a second terminal device and an identifier of a second user plane network element that provides the LAN service for the second terminal device; determining, by the group management network element, that the first terminal device and the second terminal device belong to a same local area network group; sending, by the group management network element, a first notification message to the first session management network element, where the first notification message includes the identifier of the second user plane network element and the address of the second terminal device; and sending, by the group management network element, a second notification message to the second session management network element, where the second notification message includes the identifier of the first user plane network element and the address of the first terminal device.

According to the packet transmission method provided in the first aspect, the group management network element receives the first message sent by the first session management network element and the second message sent by the second session management network element, the first message includes the address of the first terminal device and the identifier of the first user plane network element that provides the LAN service for the first terminal device, and the second message includes the address of the second terminal device and the identifier of the second user plane network element that provides the LAN service for the second terminal device. When determining that the first terminal device and the second terminal device belong to the same local area network group, the group management network element separately sends the first notification message to the first session management network element and the second notification message to the second session management network element, the first notification message includes the identifier of the second user plane network element and the address of the second terminal device, and the second notification message includes the identifier of the first user plane network element and the address of the first terminal device. In this way, the first session management network element generates a first forwarding policy based on the first notification message, and sends the first forwarding policy to the first user plane network element. When receiving a packet from the first terminal device and a destination address of the packet is the address of the second terminal device, the first user plane network element forwards the packet to the second user plane network element. The second session management network element also performs a similar process based on the second notification message. Therefore, data packet transmission between the terminal devices that belong to the same LAN group can be implemented, and a network can ensure a data exchange between the terminal devices that belong to the same LAN group.

In a possible design, the first notification message further includes an identifier of the second session management network element, and the second notification message further includes an identifier of the first session management network element.

In a possible design, the first message includes an identifier of the first terminal device, and the second message includes an identifier of the second terminal device; and the determining, by the group management network element, that the first terminal device and the second terminal device belong to a same local area network group may include:

determining, by the group management network element based on the identifier of the first terminal device and the identifier of the second terminal device, that the first terminal device and the second terminal device belong to the same local area network group.

According to a second aspect, this application provides a packet transmission method, including: receiving, by a first user plane function network element, a first forwarding policy from a first session management network element, where the first forwarding policy is used to indicate a forwarding policy of a LAN service-related packet of a first terminal device; the first forwarding policy is that when receiving a packet from the first terminal device and a destination address of the packet is an address of a second terminal device, the first user plane network element forwards the packet to a second user plane network element; and the first user plane network element provides a local area network (LAN) service for the first terminal device; receiving, by the first user plane network element, a packet from the first terminal device; and when a destination address of the packet is the address of the second terminal device, forwarding, by the first user plane network element, the packet to the second user plane network element according to the first forwarding policy.

According to the packet transmission method provided in the second aspect, the first user plane network element receives the first forwarding policy from the first session management network element, where the first forwarding policy is that when receiving a packet from the first terminal device and a destination address of the packet is the address of the second terminal device, the first user plane network element forwards the packet to the second user plane network element; the first user plane network element receives the packet from the first terminal device; and when the destination address of the packet is the address of the second terminal device, the first user plane network element forwards the packet to the second user plane network element. Therefore, data packet transmission between the terminal devices that belong to the same LAN group can be implemented, and a network can ensure a data exchange between the terminal devices that belong to the same LAN group.

In a possible design, the first forwarding policy includes the address of the second terminal device and information about the second user plane network element.

In a possible design, the information about the second user plane network element includes an address of the second user plane network element, and the forwarding, by the first user plane network element, the packet to the second user plane network element according to the first forwarding policy may include:

forwarding, by the first user plane network element, the packet to the second user plane network element indicated by the address of the second user plane network element.

In a possible design, the information about the second user plane network element includes a forwarding tunnel identifier of the second user plane network element, and the forwarding, by the first user plane network element, the packet to the second user plane network element according to the first forwarding policy may include:

forwarding, by the first user plane network element, the packet to the second user plane network element through a forwarding tunnel identified by the forwarding tunnel identifier of the second user plane network element.

In a possible design, the information about the second user plane network element includes an IP address of the second user plane network element, and the forwarding, by the first user plane network element, the packet to the second user plane network element according to the first forwarding policy may include:

encapsulating, by the first user plane network element, the packet into an IP packet and sending the IP packet to an external network, where a destination address of the IP packet is the IP address of the second user plane network element; and routing, through the external network, the IP packet to the second user plane network element indicated by the IP address of the second user plane network element.

According to a third aspect, this application provides a packet transmission method, including: sending, by a first session management network element, a first message to a group management network element, where the first message includes an identifier of a first terminal device, an address of the first terminal device, and an identifier of a first user plane function network element that provides a local area network (LAN) service for the first terminal device; receiving, by the first session management network element, a first notification message sent by the group management network element, where the first notification message includes an identifier of a second user plane network element and an address of a second terminal device, the second terminal device and the first terminal device belong to a same local area network group, and the second user plane network element provides the LAN service for the second terminal device; and generating, by the first session management network element, a first forwarding policy based on the first notification message, and sending the first forwarding policy to the first user plane network element, where the first forwarding policy is that when receiving a packet from the first terminal device and a destination address of the packet is the address of the second terminal device, the first user plane network element forwards the packet to the second user plane network element.

According to the packet transmission method provided in the third aspect, the first session management network element generates the first forwarding policy based on the first notification message, and sends the first forwarding policy to the first user plane network element. When receiving the packet from the first terminal device and the destination address of the packet is the address of the second terminal device, the first user plane network element forwards the packet to the second user plane network element. The second session management network element also performs a similar process based on the second notification message. Therefore, data packet transmission between the terminal devices that belong to the same LAN group can be implemented, and a network can ensure a data exchange between the terminal devices that belong to the same LAN group.

In a possible design, the first forwarding policy includes the address of the second terminal device and information about the second user plane network element.

In a possible design, the information about the second user plane network element includes a forwarding tunnel identifier of the second user plane network element, the first notification message further includes an identifier of the second session management network element, and before the generating, by the first session management network element, a first forwarding policy based on the first notification message, the method further includes:

establishing, by the first session management network element, a forwarding tunnel between the first user plane network element and the second user plane network element, and obtaining the forwarding tunnel identifier of the second user plane network element, where the first forwarding policy is that when receiving a packet from the first terminal device and a destination address of the packet is the address of the second terminal device, the first user plane network element forwards the packet to the second user plane network element through a forwarding tunnel identified by the forwarding tunnel identifier of the second user plane network element.

In a possible design, the information about the second user plane network element includes an address of the second user plane network element, and before the generating, by the first session management network element, a first forwarding policy based on the first notification message, the method further includes:

determining, by the first session management network element based on the identifier of the second user plane network element, the address of the second user plane network element, where the first forwarding policy is that when receiving a packet from the first terminal device and a destination address of the packet is the address of the second terminal device, the first user plane network element forwards the packet to the second user plane network element indicated by the address of the second user plane network element.

In a possible design, the information about the second user plane network element includes an IP address of the second user plane network element, and before the generating, by the first session management network element, a first forwarding policy based on the first notification message, the method further includes:

determining, by the first session management network element based on the identifier of the second user plane network element, the IP address of the second user plane network element, where the first forwarding policy is that when receiving a packet from the first terminal device and a destination address of the packet is the address of the second terminal device, the first user plane network element encapsulates the packet into an IP packet and sends the IP packet to an external network, where a destination address of the IP packet is the IP address of the second user plane network element, and routes, through the external network, the IP packet to the second user plane network element indicated by the IP address of the second user plane network element.

In a possible design, the method further includes:

sending, by the first session management network element, the first forwarding policy to the first user plane network element.

According to a fourth aspect, this application provides a packet transmission apparatus, including:

a receiving module, configured to: receive a first message sent by a first session management network element, where the first message includes an address of a first terminal device and an identifier of a first user plane network element that provides a local area network (LAN) service for the first terminal device; and receive a second message sent by a second session management network element, where the second message includes an address of a second terminal device and an identifier of a second user plane network element that provides the LAN service for the second terminal device;

a processing module, configured to determine that the first terminal device and the second terminal device belong to a same local area network group; and a sending module, configured to: send a first notification message to the first session management network element, where the first notification message includes the identifier of the second user plane network element and the address of the second terminal device; and send a second notification message to the second session management network element, where the second notification message includes the identifier of the first user plane network element and the address of the first terminal device.

In a possible design, the first notification message further includes an identifier of the second session management network element, and the second notification message further includes an identifier of the first session management network element.

In a possible design, the first message includes an identifier of the first terminal device, and the second message includes an identifier of the second terminal device; and the processing module is configured to determine, based on the identifier of the first terminal device and the identifier of the second terminal device, that the first terminal device and the second terminal device belong to the same local area network group.

For beneficial effects of the packet transmission apparatus provided in the fourth aspect and the possible designs of the fourth aspect, refer to the beneficial effects brought by the first aspect and the possible implementations of the first aspect. Details are not described herein again.

According to a fifth aspect, this application provides a packet transmission apparatus, including:

a receiving module, configured to receive a first forwarding policy from a first session management network element, where the first forwarding policy is used to indicate a forwarding policy of a local area network (LAN) service-related packet of a first terminal device; the first forwarding policy is that when receiving a packet from the first terminal device and a destination address of the packet is an address of a second terminal device, the first user plane network element forwards the packet to a second user plane network element; and the first user plane network element provides a LAN service for the first terminal device, where the receiving module is further configured to receive a packet from the first terminal device; and a sending module, configured to: when a destination address of the packet is the address of the second terminal device, forward the packet to the second user plane network element according to the first forwarding policy.

In a possible design, the first forwarding policy includes the address of the second terminal device and information about the second user plane network element.

In a possible design, the information about the second user plane network element includes an address of the second user plane network element, and the sending module is configured to:

forward the packet to the second user plane network element indicated by the address of the second user plane network element.

In a possible design, the information about the second user plane network element includes a forwarding tunnel identifier of the second user plane network element, and the sending module is configured to:

forward the packet to the second user plane network element through a forwarding tunnel identified by the forwarding tunnel identifier of the second user plane network element.

In a possible design, the information about the second user plane network element includes an IP address of the second user plane network element, and the sending module is configured to:

encapsulate the packet into an IP packet and send the IP packet to an external network, where a destination address of the IP packet is the IP address of the second user plane network element; and route, through the external network, the IP packet to the second user plane network element indicated by the IP address of the second user plane network element.

For beneficial effects of the packet transmission apparatus provided in the fifth aspect and the possible designs of the fifth aspect, refer to the beneficial effects brought by the second aspect and the possible implementations of the second aspect. Details are not described herein again.

According to a sixth aspect, this application provides a packet transmission apparatus, including:

a sending module, configured to send a first message to a group management network element, where the first message includes an identifier of a first terminal device, an address of the first terminal device, and an identifier of a first user plane function network element that provides a local area network (LAN) service for the first terminal device;

a receiving module, configured to receive a first notification message sent by the group management network element, where the first notification message includes an identifier of a second user plane network element and an address of a second terminal device, the second terminal device and the first terminal device belong to a same local area network group, and the second user plane network element provides the LAN service for the second terminal device; and a processing module, configured to generate a first forwarding policy based on the first notification message, where the sending module is further configured to send the first forwarding policy to the first user plane network element, where the first forwarding policy is that when receiving a packet from the first terminal device and a destination address of the packet is the address of the second terminal device, the first user plane network element forwards the packet to the second user plane network element.

In a possible design, the first forwarding policy includes the address of the second terminal device and information about the second user plane network element.

In a possible design, the information about the second user plane network element includes a forwarding tunnel identifier of the second user plane network element, the first notification message further includes an identifier of a second session management network element, and the processing module is further configured to:

before generating the first forwarding policy based on the first notification message, establish a forwarding tunnel between the first user plane network element and the second user plane network element, and obtain the forwarding tunnel identifier of the second user plane network element, where the first forwarding policy is that when receiving a packet from the first terminal device and a destination address of the packet is the address of the second terminal device, the first user plane network element forwards the packet to the second user plane network element through a forwarding tunnel identified by the forwarding tunnel identifier of the second user plane network element.

In a possible design, the information about the second user plane network element includes an address of the second user plane network element, and the processing module is further configured to:

before generating the first forwarding policy based on the first notification message, determine the address of the second user plane network element based on the identifier of the second user plane network element, where the first forwarding policy is that when receiving a packet from the first terminal device and a destination address of the packet is the address of the second terminal device, the first user plane network element forwards the packet to the second user plane network element indicated by the address of the second user plane network element.

In a possible design, the information about the second user plane network element includes an IP address of the second user plane network element, and the processing module is further configured to:

before generating the first forwarding policy based on the first notification message, determine the IP address of the second user plane network element based on the identifier of the second user plane network element, where the first forwarding policy is that when receiving a packet from the first terminal device and a destination address of the packet is the address of the second terminal device, the first user plane network element encapsulates the packet into an IP packet and sends the IP packet to an external network, where a destination address of the IP packet is the IP address of the second user plane network element, and routes, through the external network, the IP packet to the second user plane network element indicated by the IP address of the second user plane network element.

In a possible design, the sending module is further configured to:

send the first forwarding policy to the first user plane network element.

For beneficial effects of the packet transmission apparatus provided in the sixth aspect and the possible designs of the sixth aspect, refer to the beneficial effects brought by the third aspect and the possible implementations of the third aspect. Details are not described herein again.

According to a seventh aspect, this application provides a packet transmission apparatus, including a memory and a processor, where the memory is configured to store a program instruction; and the processor is configured to invoke the program instruction in the memory to perform the packet transmission method in any one of the first aspect or the possible designs of the first aspect, or any one of the second aspect or the possible designs of the second aspect, or any one of the third aspect or the possible designs of the third aspect.

According to an eighth aspect, this application provides a readable storage medium. The readable storage medium stores an execution instruction. When at least one processor of a packet transmission apparatus executes the execution instruction, the packet transmission apparatus performs the packet transmission method in any one of the first aspect or the possible designs of the first aspect, or any one of the second aspect or the possible designs of the second aspect, or any one of the third aspect or the possible designs of the third aspect.

According to a ninth aspect, this application provides a program product. The program product includes an execution instruction, and the execution instruction is stored in a readable storage medium. At least one processor of a packet transmission apparatus may read the execution instruction from the readable storage medium, and the at least one processor executes the execution instruction, so that the packet transmission apparatus performs the packet transmission method in any one of the first aspect or the possible designs of the first aspect, or any one of the second aspect or the possible designs of the second aspect, or any one of the third aspect or the possible designs of the third aspect.

According to a tenth aspect, this application provides a chip. The chip is connected to a memory, or a memory is integrated into the chip. When a software program stored in the memory is executed, the packet transmission method in any one of the first aspect or the possible designs of the first aspect, or any one of the second aspect or the possible designs of the second aspect, or any one of the third aspect or the possible designs of the third aspect is implemented.

According to an eleventh aspect, an embodiment of this application provides a communications system. The system includes one or more of a group management network element, a session management network element, and a user plane network element.

The group management network element may be configured to perform the method in any one of the first aspect or the possible designs of the first aspect, or the method performed by the group management network element in the solutions provided in the embodiments of this application.

The user plane network element may be configured to perform the method in any one of the second aspect or the possible designs of the second aspect, or the method performed by the user plane network element in the solutions provided in the embodiments of this application.

The session management network element may perform the method in any one of the third aspect or the possible designs of the third aspect, or the method performed by the session management network element in the solutions provided in the embodiments of this application.

In a possible design, the communications system may further include another device that interacts with the group management network element in the solutions provided in the embodiments of this application.

In another possible design, the communications system may further include another device that interacts with the session management network element in the solutions provided in the embodiments of this application.

In another possible design, the communications system may further include another device that interacts with the user plane network element in the solutions provided in the embodiments of this application.

DESCRIPTION OF EMBODIMENTS

Embodiments of this application may be applied to a wireless communications system. It should be noted that the wireless communications system mentioned in the embodiments of this application includes but is not limited to: a narrowband internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and a 5G mobile communications system.

Figure 1:
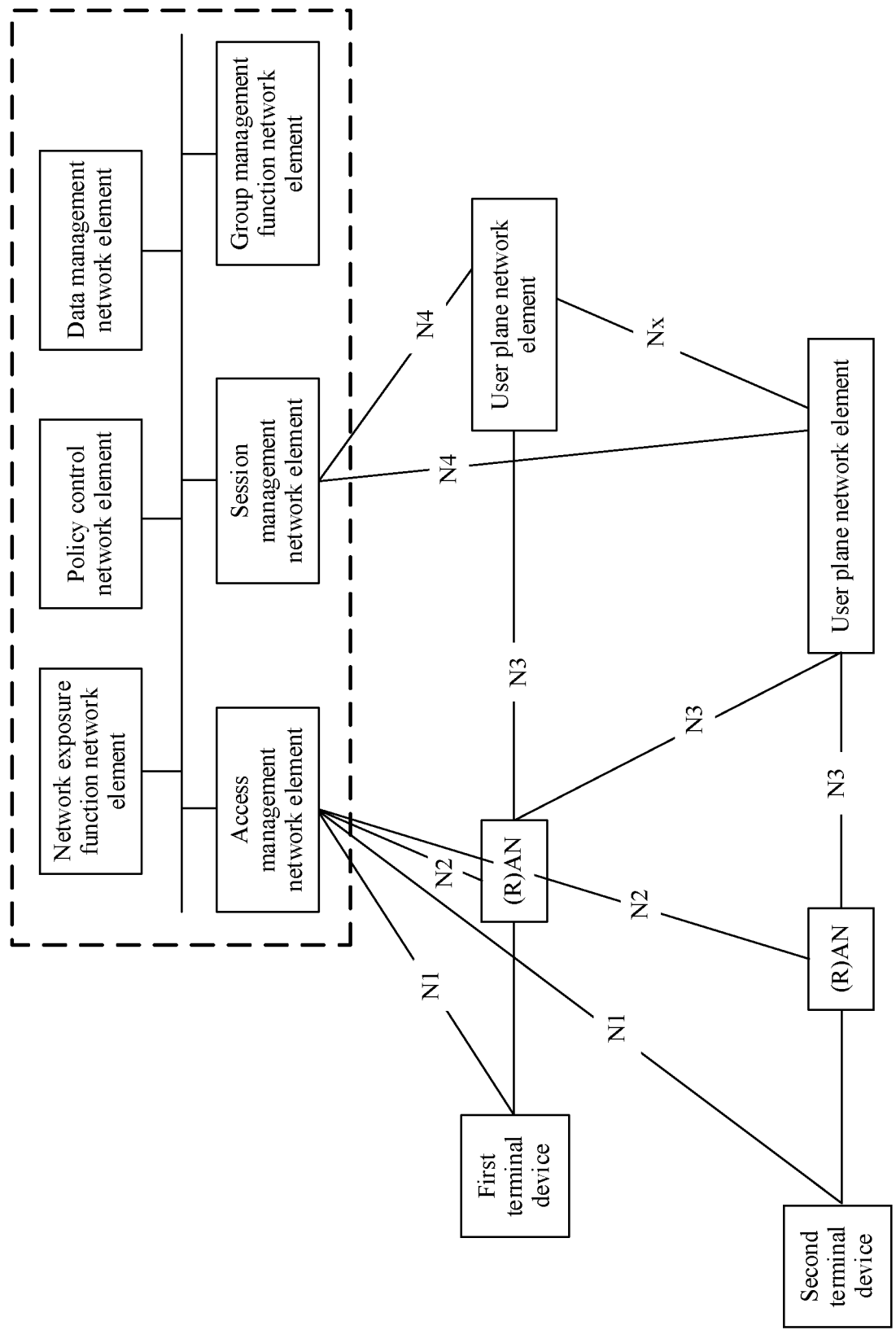
FIG. 1 is a network architecture based on which embodiments of this application are provide.

FIG. 1 is a network architecture to which embodiments of this application are applied. As shown in FIG. 1, the following separately describes components in the network architecture.

A capability exposure network element is configured to securely provide, to a third party, such as a vertical industry user, edge computing, or an application server, a service and a capability that are provided by a 3GPP network. In a 5G communications system, the capability exposure network element may be a network exposure function (NEF) network element. In a future communications system, the capability exposure network element may still be the NEF network element, or may have another name. This is not limited in this application.

A group management network element is configured to be responsible for creation and member management of a 5G LAN group. In the 5G communications system, the group management network element may be a group management function (GMF) network element. In the future communications system, the group management network element may still be the GMF network element, or may have another name. This is not limited in this application.

A user plane network element is configured to perform packet routing and forwarding, quality of service (QoS) processing of user plane data, and the like. In the 5G communications system, the user plane network element may be a user plane function (UPF) network element. In the future communications system, the user plane network element may still be the UPF network element, or may have another name. This is not limited in this application. N1, N2, N3, and N4 are standard interfaces defined in 3GPP specifications. Nx is an interface between UPFs.

An access management network element is mainly configured to perform mobility management, access management, and the like. The access management network element may be configured to implement functions, for example, lawful interception and access authorization/authentication, other than session management in functions of a mobility management entity (MME). In the 5G communications system, the access management network element may be an access and mobility management function (AMF) network element. In the future communications system, the access management network element may still be the AMF network element, or may have another name. This is not limited in this application.

A session management network element is mainly configured to: manage a session, assign and manage an internet protocol (IP) address of a terminal device, select and manage a user plane function and a policy control and charging function interface, notify downlink data, and the like. In the 5G communications system, the session management network element may be a session management function (SMF) network element. In the future communications system, the session management network element may still be the SMF network element, or may have another name. This is not limited in this application.

A policy control network element is configured to: guide a unified policy framework of network behavior, and provide policy rule information for a control plane function network element (such as the AMF network element or the SMF network element), and the like. In the 5G communications system, the policy control network element may be a policy control function (PCF) network element. In the future communications system, the policy control network element may still be the PCF network element, or may have another name. This is not limited in this application.

A data management network element is configured to: process a terminal device identifier, perform access authentication, registration, and mobility management, and the like. In the 5G communications system, the data management network element may be a unified data management (UDM) network element. In the future communications system, the data management network element may still be the UDM network element, or may have another name. This is not limited in this application.

A (radio) access network ((R)AN) network element is configured to provide a network access function for authorized terminal devices in a specific area, and can use transmission tunnels with different quality based on levels, service requirements, and the like of the terminal devices.

A terminal device may include various handheld devices, vehicle-mounted devices, wearable devices, computing devices that have a wireless communication function, or other processing devices connected to a wireless modem, and terminals in various forms, such as a mobile station (MS), a terminal, user equipment (UE), and a software terminal. For example, the terminal device may be a water meter, an electricity meter, or a sensor.

It may be understood that the foregoing network element or function may be a network element in a hardware device, a software function running on dedicated hardware, or a virtualization function instantiated on a platform (for example, a cloud platform).

In subsequent embodiments of this application, the UPF network element, the SMF network element, and the GMF network element are used as an example for description, and do not constitute a limitation on the embodiments of this application. In other words, in subsequent descriptions of this application, the UPF may be replaced with the user plane network element, the SMF may be replaced with the session management network element, and the GMF may be replaced with the group management network element.

Further, the UPF network element is referred to as the UPF for short, the SMF network element is referred to as the SMF for short, and the GMF network element is referred to as the GMF for short. For an implementation method in which an apparatus is a chip in a GMF entity, a chip in an SMF entity, or a chip in a UPF entity, refer to specific descriptions in which the apparatus is the GMF entity, the SMF entity, or the UPF entity. Details are not described again.

In the embodiments of this application, a control plane of a 5G core network uses a service-based architecture. To be specific, the NEF, the PCF, the UDM, the AMF, the SMF, and the GMF in this application are network elements of the control plane of the 5G core network, and the network elements are mutually invoked by using service-based interfaces.

This application is provided to enable peer-to-peer/mutual communication between remote 5G terminals through a 5G network without deployment and participation of an external application server, that is, to implement cross-region or cross-operator network communication between a terminal device A and a terminal device B that belong to a same 5G LAN group. However, terminal devices that communicate with each other across regions are connected to different UPFs and terminal devices that belong to different operators may also be connected to different UPFs. As shown in FIG. 1, a first terminal device is connected to one UPF through a RAN, and a second terminal device is connected to another UPF through the RAN. In FIG. 1, only two terminal devices are used as an example. Alternatively, a UPF to which a third terminal device is connected may be different from UPFs to which a first terminal device and a second terminal device are connected. This application provides a packet transmission method. Two UPFs are interconnected, and a corresponding packet forwarding policy is configured for the UPFs, so that packet transmission between terminal devices that belong to a same 5G LAN group can be implemented. The following describes the technical solutions of this application in detail with reference to the accompanying drawings.

First, a manner of interconnecting the two UPFs is described. The two UPFs are interconnected in the following three manners:

Manner 1: The UPFs are directly interconnected through a MAC layer.

Manner 2: The UPFs are interconnected by establishing a GPRS tunneling protocol (GTP) forwarding tunnel (where the tunnel is used for packet forwarding within an operator network).

Manner 3: The UPF converts a packet into an IP packet according to the layer 2 tunneling protocol (L2TP), sends the IP packet to an external network through an N6 interface, and then routes the IP packet to a peer UPF (where the packet is forwarded across operator networks) through the external network.

For the foregoing three different UPF interconnection manners, this application provides three corresponding packet transmission methods, to transmit a packet between terminal devices that belong to a same 5G LAN group. Detailed descriptions are provided below with reference to the accompanying drawings.

Figure 2A:
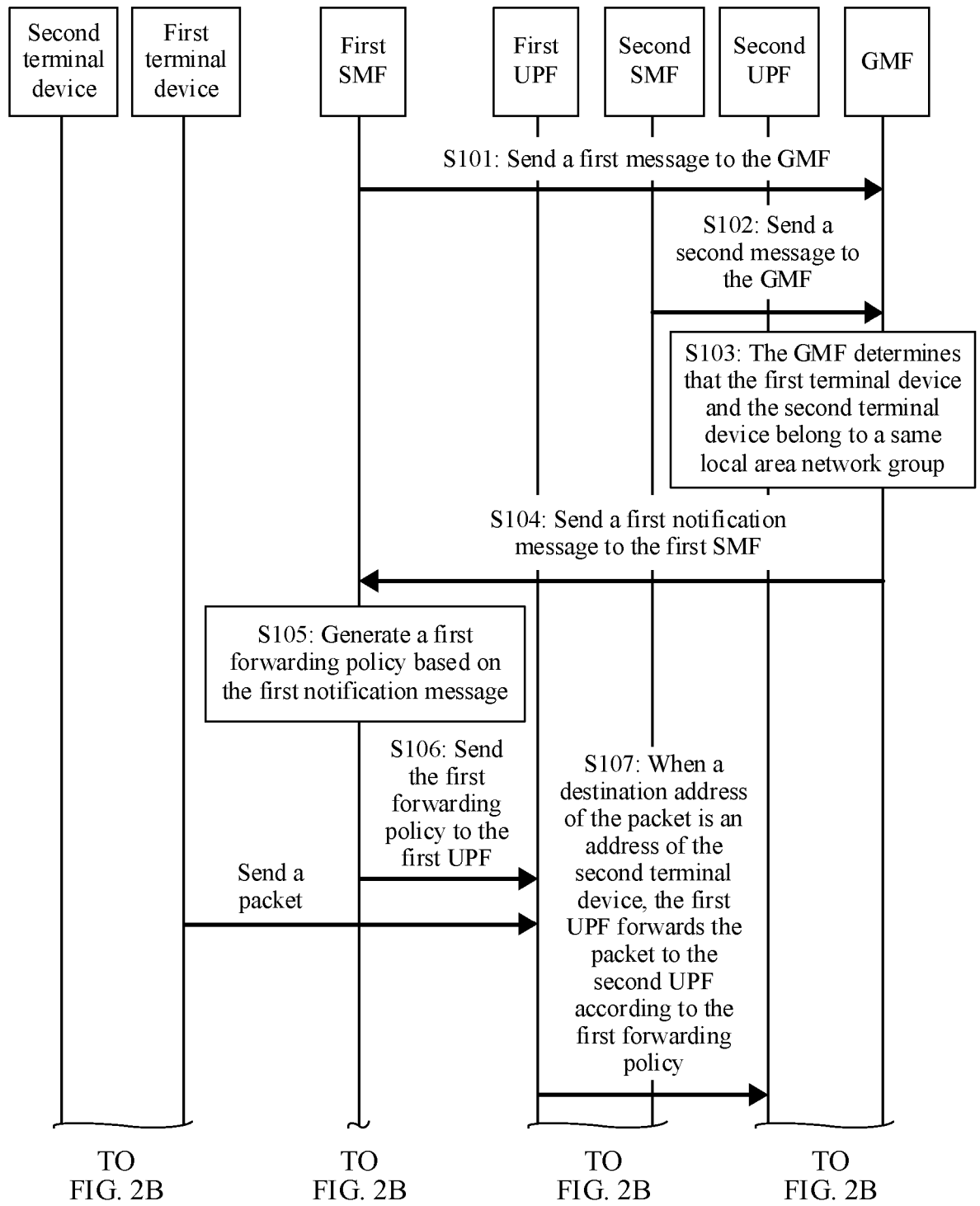
FIG. 2A and FIG. 2B are a flowchart of an embodiment of a packet transmission method according to this application.
Figure 2B:
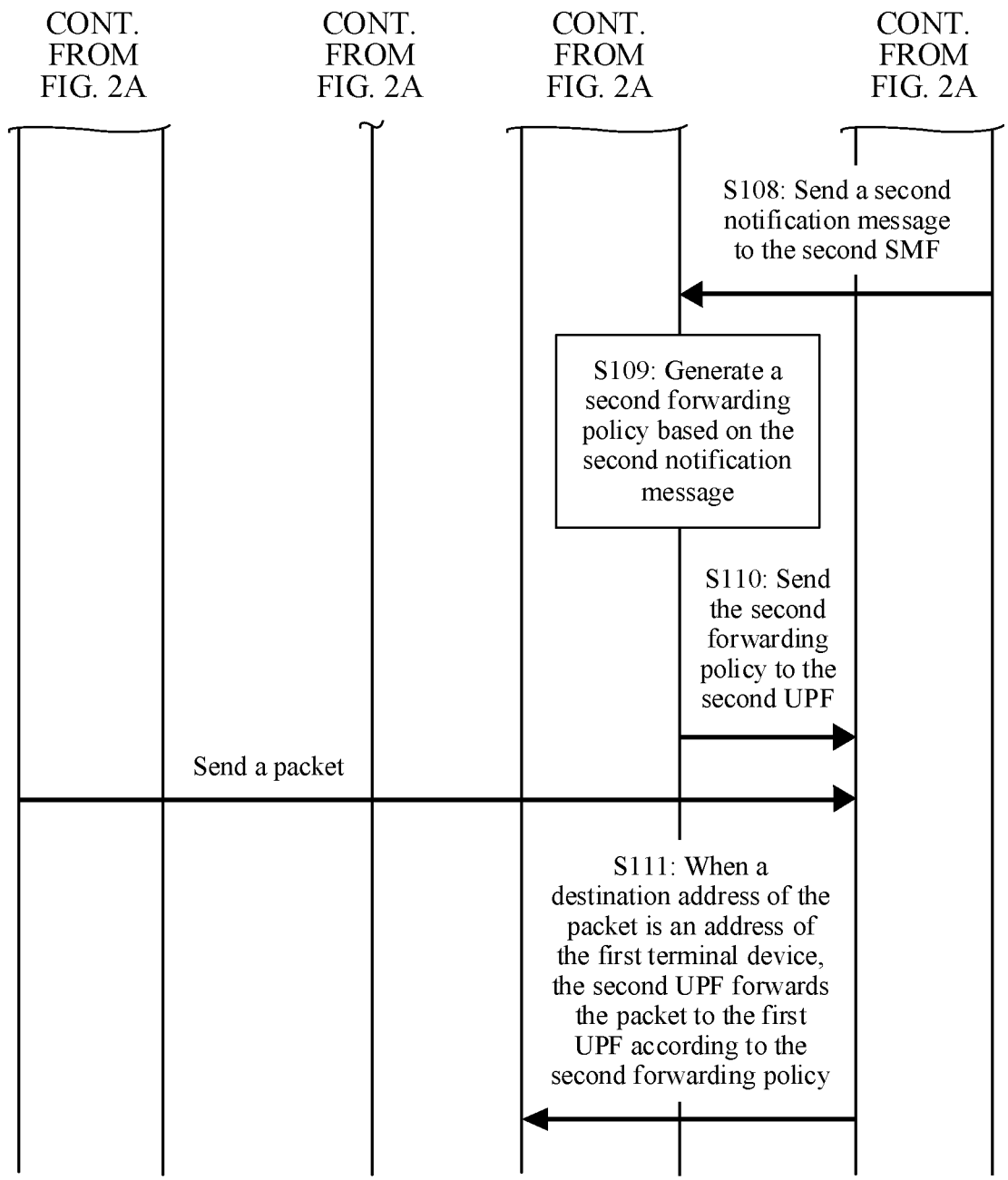

FIG. 2A and FIG. 2B are a flowchart of an embodiment of a packet transmission method according to this application. As shown in FIG. 2A and FIG. 2B, the method in this embodiment may include the following steps.

S101: A first SMF sends a first message to a GMF, where the first message includes an address of a first terminal device and an identifier of a first UPF that provides a LAN service for the first terminal device.

That the first SMF manages the first UPF, and the first UPF provides the LAN service for the first terminal device means that the first terminal device may establish a PDU session to the first UPF. That is, the first terminal device may be connected to the first UPF, and the PDU session is used to transmit a packet.

S102: A second SMF sends a second message to the GMF, where the second message includes an address of a second terminal device and an identifier of a second UPF that provides the LAN service for the second terminal device.

The second SMF manages the second UPF, the second UPF provides the LAN service for the second terminal device, and the second terminal device may be connected to the first UPF.

S103: The GMF determines that the first terminal device and the second terminal device belong to a same local area network group.

In an implementable manner, the first message includes an identifier of the first terminal device, and the second message includes an identifier of the second terminal device. S103 may be specifically: The GMF determines, based on the identifier of the first terminal device and the identifier of the second terminal device, that the first terminal device and the second terminal device belong to the same local area network group. For example, specifically, the GMF may store a member list, for example, a terminal device identifier table, of each local area network group. The GMF may learn, by querying the member list, that the first terminal device and the second terminal device belong to the same local area network group.

S104: The GMF sends a first notification message to the first SMF, where the first notification message includes the identifier of the second UPF and the address of the second terminal device.

S105: The first SMF generates a first forwarding policy based on the first notification message, where the first forwarding policy is that when receiving a packet from the first terminal device and a destination address of the packet is the address of the second terminal device, the first UPF forwards the packet to the second UPF.

Specifically, the packet from the first terminal device is a packet transmitted through a LAN session. The LAN session is a PDU session created by the first UPF for the first terminal device, and is used for the LAN service. The first terminal device may subsequently perform a group communication service with another terminal device in the local area network group through the LAN session.

Optionally, the first forwarding policy includes the address of the second terminal device and information about the second UPF.

In this embodiment, optionally, for the foregoing three different UPF interconnection manners, there are three corresponding first forwarding policies.

In a first implementation manner, the first notification message further includes an identifier of the second SMF, the information about the second UPF includes a forwarding tunnel identifier of the second UPF, and before the step S105 of generating, by the first SMF, a first forwarding policy based on the first notification message, the method may further include:

establishing, by the first SMF, a forwarding tunnel between the first UPF and the second UPF, and obtaining the forwarding tunnel identifier of the second UPF; and generating, by the first SMF, the first forwarding policy based on the forwarding tunnel identifier of the second UPF, where the first forwarding policy is that when receiving a packet from the first terminal device and a destination address of the packet is the address of the second terminal device, the first UPF forwards the packet to the second UPF through a forwarding tunnel identified by the forwarding tunnel identifier of the second UPF. In this manner, the UPFs are interconnected by establishing the GTP forwarding tunnel.

In a second implementation manner, the information about the second UPF includes an address of the second UPF, and before the step S105 of generating, by the first SMF, a first forwarding policy based on the first notification message, the method may further include:

determining, by the first SMF, the address of the second UPF based on the identifier of the second UPF, where the first forwarding policy is that when receiving a packet from the first terminal device and a destination address of the packet is the address of the second terminal device, the first UPF forwards the packet to the second UPF indicated by the address of the second UPF, and the address of the second UPF is determined by the first SMF based on the identifier of the second UPF. In this manner, the UPFs are directly interconnected through a MAC layer.

In a third implementation manner, the information about the second UPF includes an IP address of the second UPF, and before the step S105 of generating, by the first SMF, a first forwarding policy based on the first notification message, the method may further include:

determining, by the first SMF, the IP address of the second UPF based on the identifier of the second UPF, where the first forwarding policy is that when receiving a packet from the first terminal device and a destination address of the packet is the address of the second terminal device, the first UPF encapsulates the packet into an IP packet and sends the IP packet to an external network, where a destination address of the IP packet is the IP address of the second UPF, and routes, through the external network, the IP packet to the second UPF indicated by the IP address of the second UPF. In this manner, the UPF converts the packet into the IP packet according to L2TP, sends the IP packet to the external network through an N6 interface, and then routes the IP packet to the peer UPF via IP.

S106: The first SMF sends the first forwarding policy to the first UPF.

S107: When receiving a packet from the first terminal device, and a destination address of the packet is the address of the second terminal device, the first UPF forwards the packet to the second UPF according to the first forwarding policy.

Accordingly, corresponding to the three implementable manners of the first forwarding policy in S105, there are three specific implementations in which the first UPF forwards the packet to the second UPF according to the first forwarding policy:

Manner 1: The first UPF forwards the packet to the second UPF through the forwarding tunnel identified by the forwarding tunnel identifier of the second UPF.

Manner 2: The first UPF forwards the packet to the second UPF indicated by the address of the second UPF.

Manner 3: The first UPF encapsulates the packet into an IP packet and sends the IP packet to the external network, and routes, through the external network, the IP packet to the second UPF indicated by the IP address of the second UPF. A destination address of the IP packet is the IP address of the second UPF.

S108: The GMF sends a second notification message to the second SMF, where the second notification message includes the identifier of the first UPF and the address of the first terminal device.

Specifically, after the second SMF receives the second notification message, a process performed by the second SMF is similar to a process performed by the first SMF. Details are as follows:

S109: The second SMF generates a second forwarding policy based on the second notification message, where the second forwarding policy is that when receiving a packet from the second terminal device and a destination address of the packet is the address of the first terminal device, the second UPF forwards the packet to the first UPF.

Specifically, the packet from the second terminal device is a packet transmitted through the LAN session.

Optionally, the second forwarding policy includes the address of the first terminal device and information about the first UPF.

In this embodiment, optionally, for the foregoing three different UPF interconnection manners, there are three corresponding second forwarding policies.

In a first implementation manner, the second notification message further includes an identifier of the first SMF, the information about the first UPF includes a forwarding tunnel identifier of the first UPF, and before the step S109 of generating, by the second SMF, a second forwarding policy based on the second notification message, the method may further include:

establishing, by the second SMF, the forwarding tunnel between the first UPF and the second UPF, and obtaining the forwarding tunnel identifier of the first UPF; and generating, by the second SMF, the second forwarding policy based on the forwarding tunnel identifier of the first UPF, where the second forwarding policy is that when receiving a packet from the second terminal device and a destination address of the packet is the address of the first terminal device, the second UPF forwards the packet to the first UPF through a forwarding tunnel identified by the forwarding tunnel identifier of the first UPF. In this manner, the UPFs are interconnected by establishing the GTP forwarding tunnel.

It should be noted that, in this manner, the forwarding tunnel between the first UPF and the second UPF only needs to be established by one of the first SMF and the second SMF.

In a second implementation manner, the information about the first UPF includes an address of the first UPF, and before the step S109 of generating, by the second SMF, a second forwarding policy based on the second notification message, the method may further include:

determining, by the second SMF, the address of the first UPF based on the identifier of the first UPF, where the second forwarding policy is that when receiving a packet from the second terminal device and a destination address of the packet is the address of the first terminal device, the second UPF forwards the packet to the first UPF indicated by the address of the first UPF, and the address of the first UPF is determined by the second SMF based on the identifier of the first UPF. In this manner, the UPFs are directly interconnected through the MAC layer.

In a third implementation manner, the information about the first UPF includes an IP address of the first UPF, and before the step S109 of generating, by the second SMF, a second forwarding policy based on the second notification message, the method may further include:

determining, by the second SMF, the IP address of the first UPF based on the identifier of the first UPF, where the second forwarding policy is that when receiving a packet from the second terminal device and a destination address of the packet is the address of the first terminal device, the second UPF encapsulates the packet into an IP packet and sends the IP packet to the external network, where a destination address of the IP packet is the IP address of the first UPF, and routes, through the external network, the IP packet to the first UPF indicated by the IP address of the first UPF. In this manner, the UPF converts the packet into the IP packet according to L2TP, sends the IP packet to the external network through the N6 interface, and then routes the IP packet to the peer UPF via IP.

S110: The second SMF sends the second forwarding policy to the second UPF.

S111: When receiving a packet from the second terminal device, and a destination address of the packet is the address of the first terminal device, the second UPF forwards the packet to the first UPF according to the second forwarding policy.

Accordingly, corresponding to the three implementable manners of the second forwarding policy in S109, there are three specific implementations in which the second UPF forwards the packet to the first UPF according to the second forwarding policy:

Manner 1: The second UPF forwards the packet to the first UPF through the forwarding tunnel identified by the forwarding tunnel identifier of the first UPF.

Manner 2: The second UPF forwards the packet to the first UPF indicated by the address of the first UPF.

Manner 3: The second UPF encapsulates the packet into an IP packet and sends the IP packet to the external network, and routes, through the external network, the IP packet to the first UPF indicated by the IP address of the first UPF.

According to the packet transmission method provided in this embodiment, the GMF receives the first message sent by the first SMF and the second message sent by the second SMF, where the first message includes the address of the first terminal device and the identifier of the first UPF that provides the LAN service for the first terminal device, and the second message includes the address of the second terminal device and the identifier of the second UPF that provides the LAN service for the second terminal device. When determining that the first terminal device and the second terminal device belong to the same local area network group, the GMF separately sends the first notification message to the first SMF and the second notification message to the second SMF, where the first notification message includes the identifier of the second UPF and the address of the second terminal device, and the second notification message includes the identifier of the first UPF and the address of the first terminal device. In this way, the first SMF generates the first forwarding policy based on the first notification message, and sends the first forwarding policy to the first UPF. When receiving the packet from the first terminal device and the destination address of the packet is the address of the second terminal device, the first UPF forwards the packet to the second UPF. The second SMF also performs a similar process based on the second notification message. Therefore, data packet transmission between the terminal devices that belong to the same LAN group can be implemented, and a network can ensure a data exchange between the terminal devices that belong to the same LAN group.

The technical solution of the method embodiment shown in FIG. 2A and FIG. 2B is described in detail below by using three specific embodiments.

Figure 3A:
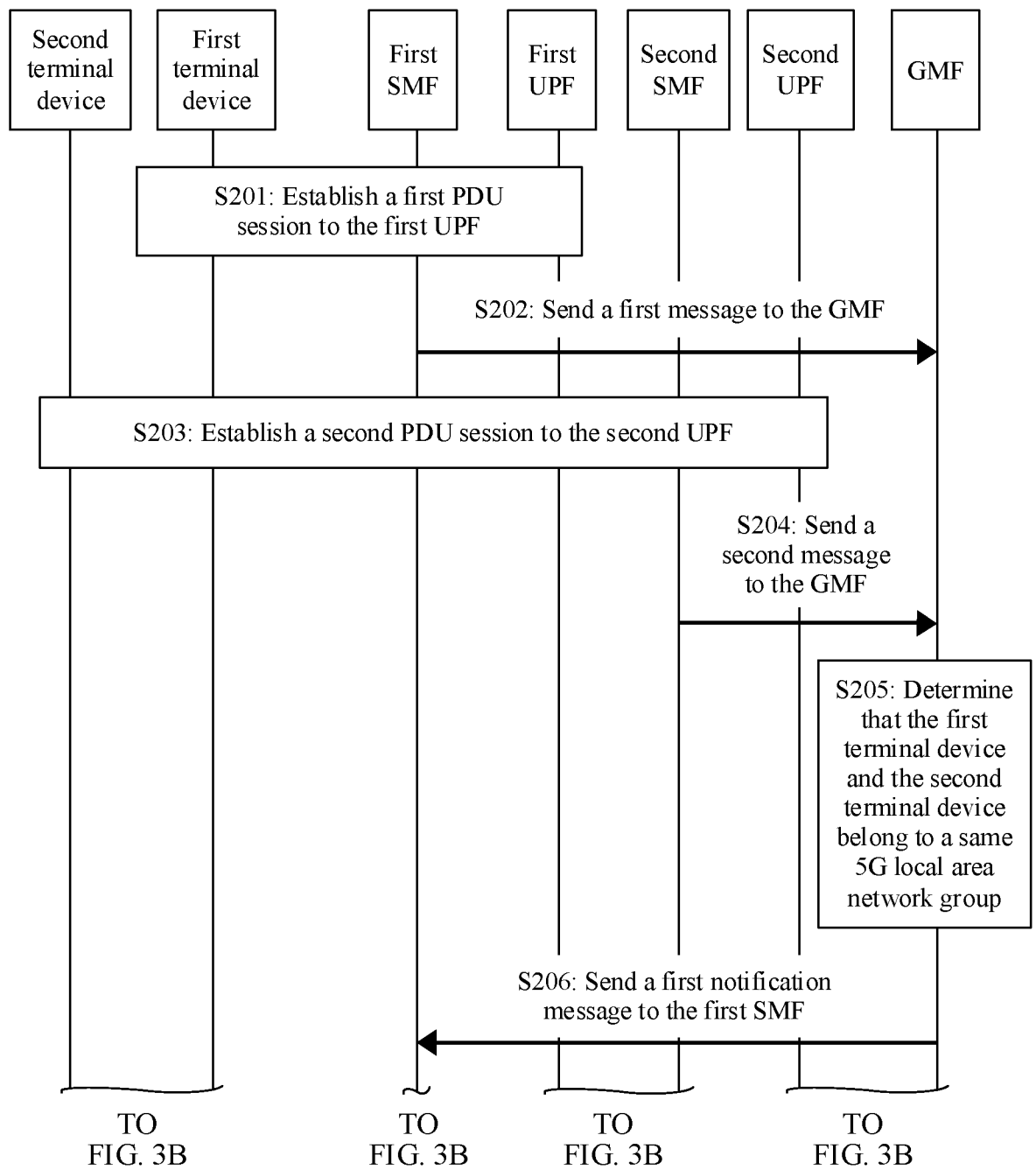
FIG. 3A and FIG. 3B are a flowchart of an embodiment of a packet transmission method according to this application.
Figure 3B:
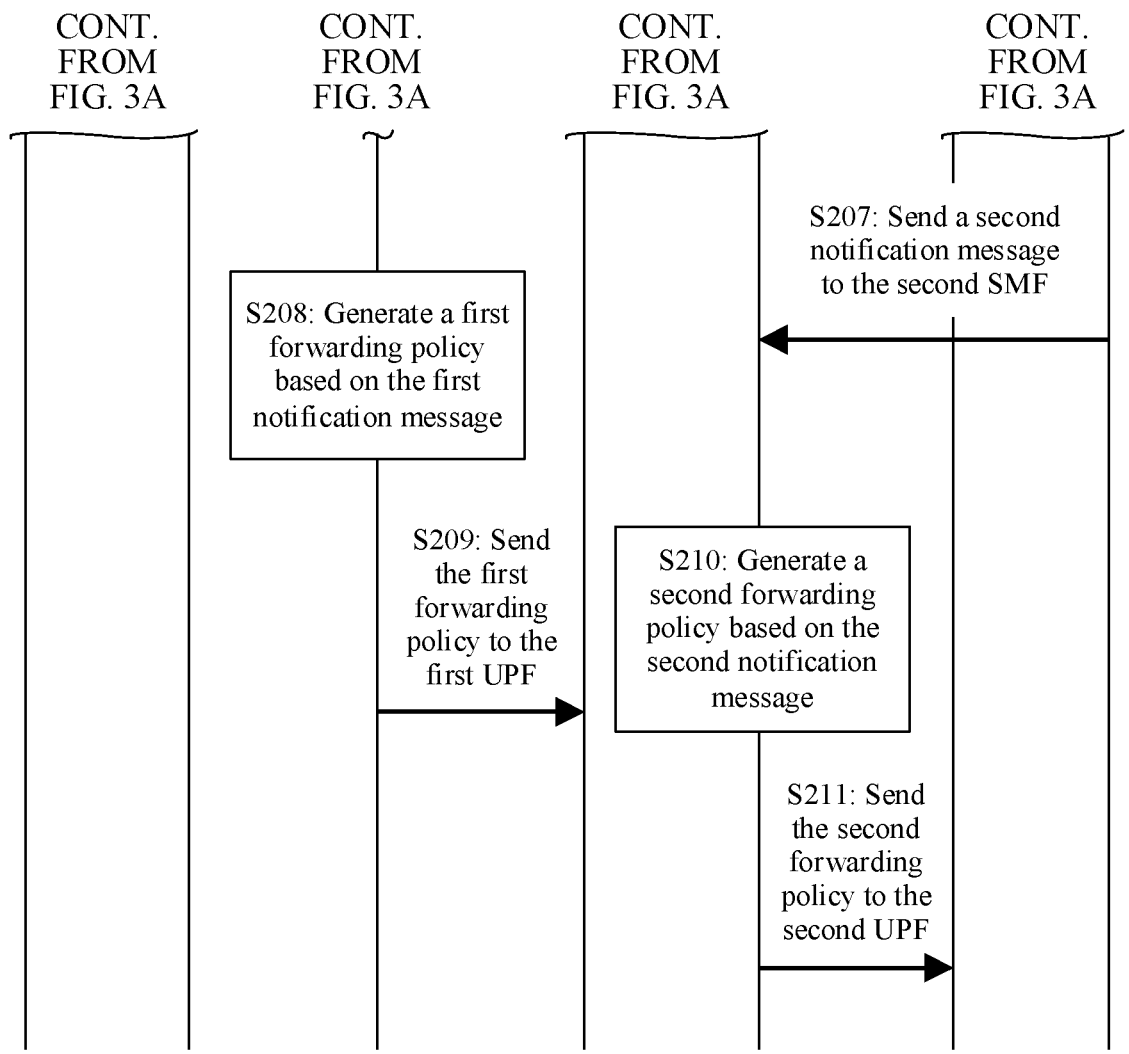

FIG. 3A and FIG. 3B are a flowchart of an embodiment of a packet transmission method according to this application. In this embodiment, an example in which UPFs are directly interconnected through a MAC layer is used. As shown in FIG. 3A and FIG. 3B, the method in this embodiment may include the following steps.

S201: A first terminal device establishes a first PDU session to a first UPF.

The first PDU session is used to connect the first terminal device in a 5G LAN service and the first UPF. That is, subsequently, the first UPF provides a local area network LAN service for the first terminal device.

S202: A first SMF that manages the first UPF sends a first message to a GMF, where the first message includes an identifier of the first terminal device, an address of the first terminal device, and an identifier of the first UPF that provides the 5G LAN service for the first terminal device.

Specifically, the first SMF sends a PDU context to the GMF, and the context includes the identifier of the first terminal device, the address of the first terminal device, and the identifier of the first UPF.

Optionally, the context further includes an identifier of the first SMF.

S203: A second terminal device establishes a second PDU session to a second UPF.

The second PDU session is used to connect the second terminal device in the 5G LAN service and the second UPF. That is, subsequently, the second UPF provides the local area network (LAN) service for the second terminal device.

S204: A second SMF that manages the second UPF sends a second message to the GMF, where the second message includes an identifier of the second terminal device, an address of the second terminal device, and an identifier of the second UPF that provides the 5G LAN service for the second terminal device.

Optionally, the second message further includes an identifier of the second SMF.

S205: The GMF determines, based on the identifier of the first terminal device and the identifier of the second terminal device, that the first terminal device and the second terminal device belong to a same 5G local area network group.

Specifically, the GMF determines that the first terminal device and the second terminal device belong to the same 5G local area network group, and the first PDU session and the second PDU session are established by different UPFs.

Specifically, the GMF may store a member list, for example, a terminal device identifier table, of each 5G local area network group. The GMF may learn, by querying the member list, that the first terminal device and the second terminal device belong to the same 5G local area network group.

S206: The GMF sends a first notification message to the first SMF, where the first notification message includes the identifier of the second UPF and the address of the second terminal device.

S207: The GMF sends a second notification message to the second SMF, where the second notification message includes the identifier of the first UPF and the address of the first terminal device.

S208: The first SMF determines an address of the second UPF based on the identifier of the second UPF, and generates a first forwarding policy based on the first notification message.

Optionally, the first forwarding policy includes the address of the second terminal device and information about the second UPF, where the information about the second UPF includes the address of the second UPF, and the first forwarding policy is that when receiving a packet from the first terminal device and a destination address of the packet is the address of the second terminal device, the first UPF forwards the packet to the second UPF indicated by the address of the second UPF.

S209: The first SMF sends the first forwarding policy to the first UPF.

Specifically, after receiving the first forwarding policy, when receiving a packet from the first terminal device through the first PDU session and a destination address of the packet is the address of the second terminal device, the first UPF forwards the packet to the second UPF indicated by the address of the second UPF.

Further, subsequently, the second UPF may forward the packet to the second terminal device through the second PDU session.

S210: The second SMF determines an address of the first UPF based on the identifier of the first UPF, and generates a second forwarding policy based on the second notification message.

Optionally, the second forwarding policy includes the address of the first terminal device and information about the first UPF, where the information about the first UPF includes the address of the first UPF, and the second forwarding policy is that when receiving a packet from the second terminal device and a destination address of the packet is the address of the first terminal device, the second UPF forwards the packet to the first UPF indicated by the address of the first UPF.

S211: The second SMF sends the second forwarding policy to the second UPF.

Specifically, after receiving the second forwarding policy, when receiving a packet from the second terminal device through the second PDU session and a destination address of the packet is the address of the first terminal device, the second UPF forwards the packet to the first UPF indicated by the address of the first UPF.

Further, subsequently, the first UPF may forward the packet to the first terminal device through the first PDU session.

According to the packet transmission method provided in this embodiment, data packet transmission between the terminal devices that belong to the same 5G LAN group can be implemented, and a 5G network can ensure a data exchange between the terminal devices that belong to the same 5G LAN group.

Figure 4:
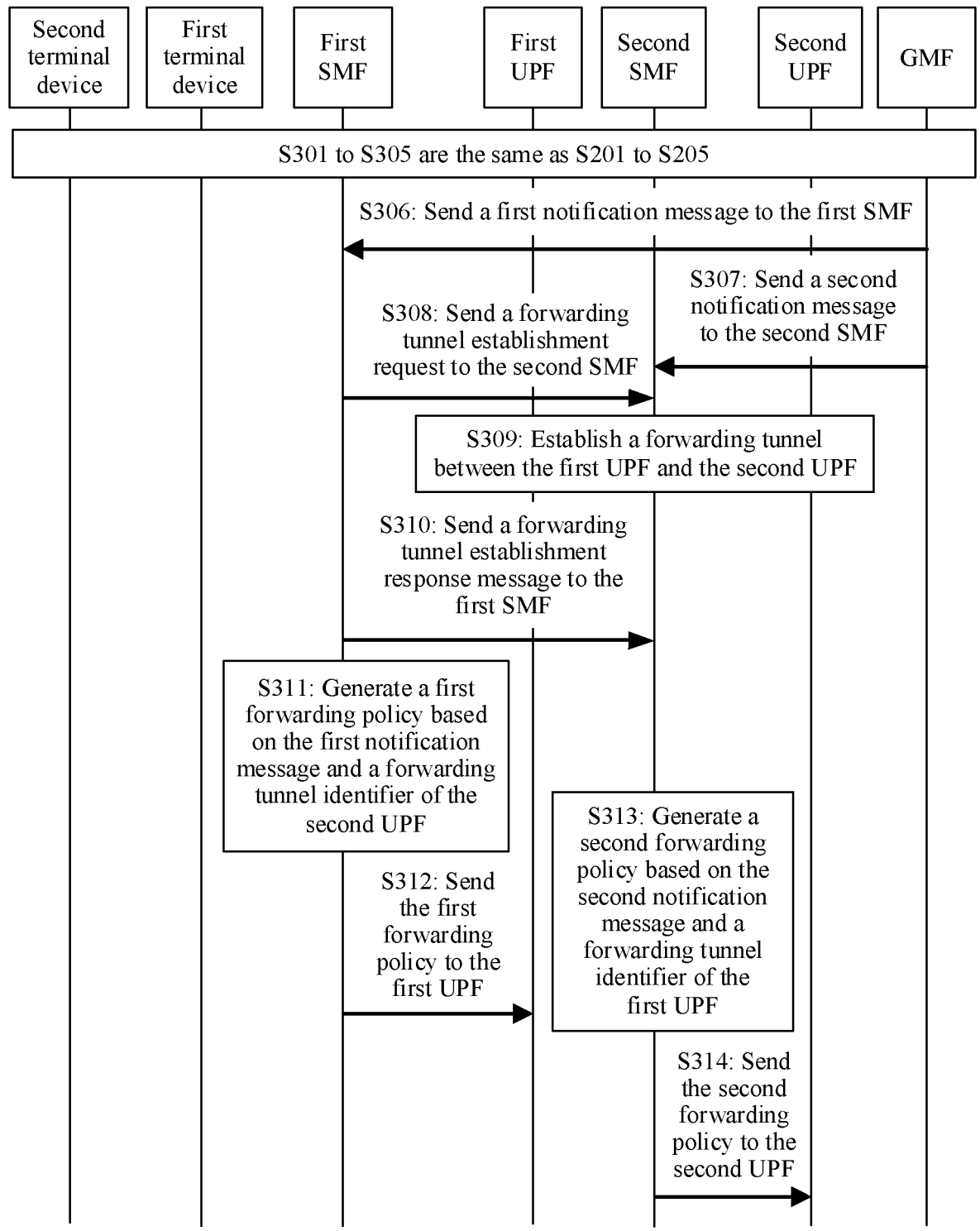
FIG. 4 is a flowchart of an embodiment of a packet transmission method according to this application.

FIG. 4 is a flowchart of an embodiment of a packet transmission method according to this application. In this embodiment, an example in which UPFs are interconnected by establishing a GTP forwarding tunnel is used. As shown in FIG. 4, the method in this embodiment may include the following steps.

S301 to S305 are the same as S201 to S205. For details, refer to S201 to S205.

S306: The GMF sends a first notification message to the first SMF, where the first notification message includes the identifier of the second SMF, the identifier of the second UPF, and the address of the second terminal device.

Optionally, the first notification message further includes indication information used to indicate the first SMF to establish a forwarding tunnel to the second SMF.

S307: The GMF sends a second notification message to the second SMF, where the second notification message includes the identifier of the first SMF, the identifier of the first UPF, and the address of the first terminal device.

S308: The first SMF sends, to the second SMF, a forwarding tunnel establishment request used to request to establish a forwarding tunnel between the first UPF and the second UPF.

Optionally, the forwarding tunnel establishment request includes an identifier of the local area network group to which the first terminal device and the second terminal device belong. The local area network group may be a virtual network, and the identifier of the local area network group may be an identifier of the virtual network.

S309: Establish the forwarding tunnel between the first UPF and the second UPF under control of the first SMF and the second SMF. A process of establishing the forwarding tunnel is the same as an existing establishment process. Optionally, the forwarding tunnel is used only for the local area network group corresponding to the identifier of the foregoing specified local area network group. That is, in communication between terminal devices that belongs to another local area network group, forwarding cannot be performed through the forwarding tunnel.

S310: The second SMF sends a forwarding tunnel establishment response message to the first SMF, where the forwarding tunnel establishment response message is used to indicate that the forwarding tunnel has been established. Specifically, after the forwarding tunnel has been established, the first SMF obtains a forwarding tunnel identifier of the second UPF, and the second SMF obtains a forwarding tunnel identifier of the first UPF.

S311: The first SMF generates a first forwarding policy based on the first notification message and the forwarding tunnel identifier of the second UPF.

Optionally, the first forwarding policy includes the address of the second terminal device and information about the second UPF. The information about the second UPF includes the forwarding tunnel identifier of the second UPF. The first forwarding policy is that when receiving a packet from the first terminal device and a destination address of the packet is the address of the second terminal device, the first UPF forwards the packet to the second UPF through a forwarding tunnel identified by the forwarding tunnel identifier of the second UPF.

S312: The first SMF sends the first forwarding policy to the first UPF.

Specifically, after receiving the first forwarding policy, when receiving a packet from the first terminal device through the first PDU session and a destination address of the packet is the address of the second terminal device, the first UPF forwards the packet to the second UPF through the forwarding tunnel identified by the forwarding tunnel identifier of the second UPF.

Further, subsequently, the second UPF may forward the packet to the second terminal device through the second PDU session.

S313: The second SMF generates a second forwarding policy based on the second notification message and the forwarding tunnel identifier of the first UPF.

Optionally, the second forwarding policy includes the address of the first terminal device and information about the first UPF. The information about the first UPF includes the forwarding tunnel identifier of the first UPF. The second forwarding policy is that when receiving a packet from the second terminal device and a destination address of the packet is the address of the first terminal device, the second UPF forwards the packet to the first UPF through a forwarding tunnel identified by the forwarding tunnel identifier of the first UPF.

S314: The second SMF sends the second forwarding policy to the second UPF.

Specifically, after receiving the second forwarding policy, when receiving a packet from the second terminal device through the second PDU session and a destination address of the packet is the address of the first terminal device, the second UPF forwards the packet to the first UPF through the forwarding tunnel identified by the forwarding tunnel identifier of the first UPF.

Further, subsequently, the first UPF may forward the packet to the first terminal device through the first PDU session.

According to the packet transmission method provided in this embodiment, data packet transmission between the terminal devices that belong to the same 5G LAN group can be implemented, and a 5G network can ensure a data exchange between the terminal devices that belong to the same 5G LAN group.

Figure 5:
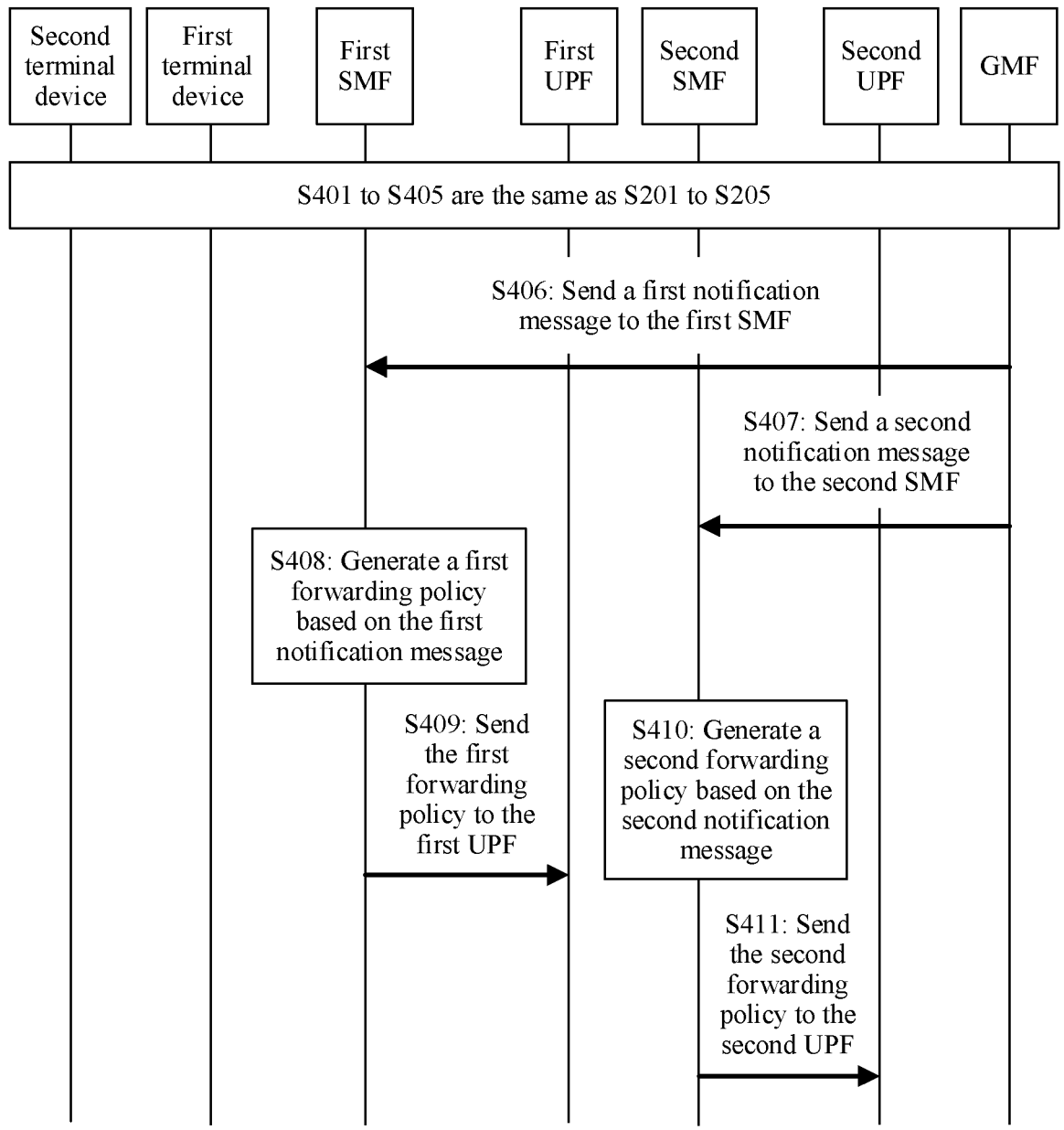
FIG. 5 is a flowchart of an embodiment of a packet transmission method according to this application.

FIG. 5 is a flowchart of an embodiment of a packet transmission method according to this application. In this embodiment, an example in which a UPF converts a packet into an IP packet according to L2TP, sends the IP packet to an external network through an N6 interface, and then routes the IP packet to a peer UPF via IP is used. As shown in FIG. 5, the method in this embodiment may include the following steps.

S401 to S405 are the same as S201 to S205. For details, refer to S201 to S205.

S406: The GMF sends a first notification message to the first SMF, where the first notification message includes the identifier of the second UPF and the address of the second terminal device.

Optionally, the first notification message includes an address list of terminal devices that establishes a PDU session to the second UPF, namely, addresses of the plurality of terminal devices, and the address list may be a MAC address list.

S407: The GMF sends a second notification message to the second SMF, where the second notification message includes the identifier of the first UPF and the address of the first terminal device.

Optionally, the second notification message includes an address list of terminal devices that establishes a PDU session to the first UPF, namely, addresses of the plurality of terminal devices, and the address list may be a MAC address list.

S408: The first SMF determines an IP address of the second UPF based on the identifier of the second UPF, and generates a first forwarding policy based on the first notification message.

Optionally, the first forwarding policy includes the address of the second terminal device and information about the second UPF. The information about the second UPF includes the IP address of the second UPF. The first forwarding policy is that when receiving a packet from the first terminal device and a destination address of the packet is the address of the second terminal device, the first UPF encapsulates the packet into an IP packet and sends the IP packet to the external network, and routes, through the external network, the IP packet to the second UPF indicated by the IP address of the second UPF.

S409: The first SMF sends the first forwarding policy to the first UPF.

Specifically, after receiving the first forwarding policy, when receiving a packet from the first terminal device through the first PDU session and a destination address of the packet is the address of the second terminal device, the first UPF encapsulates the packet into an IP packet, where a source IP address is an IP address of the first UPF and a destination IP address is the IP address of the second UPF, and the first UPF needs to send the IP packet to the external network through the N6 interface. The first UPF routes, through the external network, the IP packet to the second UPF based on the IP address of the second UPF. The second UPF obtains the original packet from the IP packet, and forwards the original packet to the second terminal device based on the destination address.

Further, subsequently, the second UPF may forward the packet to the second terminal device through the second PDU session.

S410: The second SMF determines the IP address of the first UPF based on the identifier of the first UPF, and generates a second forwarding policy based on the second notification message.

Optionally, the second forwarding policy includes the address of the first terminal device and information about the first UPF. The information about the first UPF includes the IP address of the first UPF. The second forwarding policy is that when receiving a packet from the second terminal device and a destination address of the packet is the address of the first terminal device, the second UPF encapsulates the packet into an IP packet and sends the IP packet to the external network, and routes, through the external network, the IP packet to the first UPF indicated by the IP address of the first UPF.

S411: The second SMF sends the second forwarding policy to the second UPF.

Specifically, after receiving the second forwarding policy, when receiving a packet from the second terminal device through the second PDU session and a destination address of the packet is the address of the first terminal device, the second UPF encapsulates the packet into an IP packet, where a source IP address is the IP address of the second UPF and a destination IP address is the IP address of the first UPF, and the second UPF needs to send the IP packet to the external network through the N6 interface. The second UPF routes, through the external network, the IP packet to the first UPF based on the IP address of the first UPF. The first UPF obtains the original packet from the IP packet, and forwards the original packet to the first terminal device based on the destination address.

Further, subsequently, the first UPF may forward the packet to the first terminal device through the first PDU session.

According to the packet transmission method provided in this embodiment, data packet transmission between the terminal devices that belong to the same 5G LAN group can be implemented, and a 5G network can ensure a data exchange between the terminal devices that belong to the same 5G LAN group.

Figure 6:
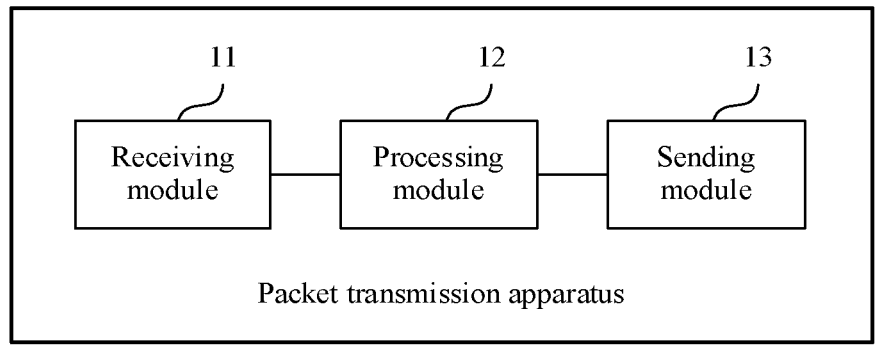
FIG. 6 is a schematic structural diagram of an embodiment of a packet transmission apparatus according to this application.

FIG. 6 is a schematic structural diagram of an embodiment of a packet transmission apparatus according to this application. As shown in FIG. 6, the apparatus in this embodiment may include a receiving module 11, a processing module 12, and a sending module 13. The receiving module 11 is configured to: receive a first message sent by a first session management function SMF, where the first message includes an address of a first terminal device and an identifier of a first user plane function (UPF) that provides a local area network (LAN) service for the first terminal device; and receive a second message sent by a second SMF, where the second message includes an address of a second terminal device and an identifier of a second UPF that provides the LAN service for the second terminal device.

The processing module 12 is configured to determine that the first terminal device and the second terminal device belong to a same local area network group.

The sending module 13 is configured to: send a first notification message to the first SMF, where the first notification message includes the identifier of the second UPF and the address of the second terminal device; and send a second notification message to the second SMF, where the second notification message includes the identifier of the first UPF and the address of the first terminal device.

Optionally, the first notification message further includes an identifier of the second SMF, and the second notification message further includes an identifier of the first SMF.

Optionally, the first message includes an identifier of the first terminal device, and the second message includes an identifier of the second terminal device.

The processing module 12 is configured to determine, based on the identifier of the first terminal device and the identifier of the second terminal device, that the first terminal device and the second terminal device belong to the same local area network group.

The apparatus in this embodiment may be configured to perform the technical solution in the method embodiment shown in FIG. 2A and FIG. 2B. A technical effect and an implementation principle of the apparatus are similar to those of the technical solution in the method embodiment shown in FIG. 2A and FIG. 2B. Details are not described herein again.

Figure 7:
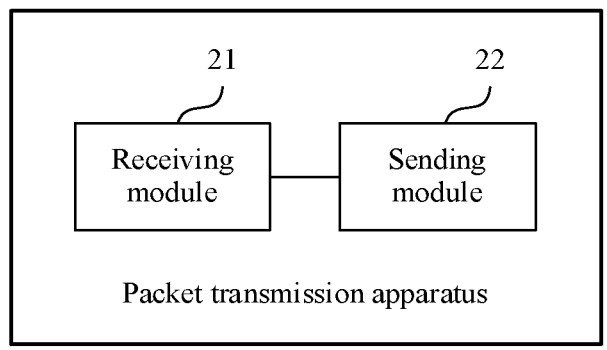
FIG. 7 is a schematic structural diagram of an embodiment of a packet transmission apparatus according to this application.

FIG. 7 is a schematic structural diagram of an embodiment of a packet transmission apparatus according to this application. As shown in FIG. 7, the apparatus in this embodiment may include a receiving module 21 and a sending module 22.

The receiving module 21 is configured to receive a first forwarding policy from a first SMF, where the first forwarding policy is used to indicate a forwarding policy of a LAN service-related packet of a first terminal device, and the first forwarding policy is that when receiving a packet from the first terminal device and a destination address of the packet is an address of a second terminal device, a first UPF forwards the packet to a second UPF.

The receiving module 21 is further configured to receive a packet from the first terminal device, where the first UPF provides a local area network (LAN) service for the first terminal device.

The sending module 22 is configured to: when a destination address of the packet is the address of the second terminal device, forward the packet to the second UPF according to the first forwarding policy.

Optionally, the first forwarding policy includes the address of the second terminal device and information about the second UPF.

Optionally, the information about the second UPF includes an address of the second UPF. The sending module 22 is configured to:

forward the packet to the second UPF indicated by the address of the second UPF.

Optionally, the information about the second UPF includes a forwarding tunnel identifier of the second UPF. The sending module 22 is configured to:

forward the packet to the second UPF through a forwarding tunnel identified by the forwarding tunnel identifier of the second UPF.

Optionally, the information about the second UPF includes an IP address of the second UPF. The sending module 22 is configured to:

encapsulate the packet into an IP packet and send the IP packet to an external network, where a destination address of the IP packet is the IP address of the second UPF; and route, through the external network, the IP packet to the second UPF indicated by the IP address of the second UPF.

The apparatus in this embodiment may be configured to perform the technical solution in the method embodiment shown in FIG. 2A and FIG. 2B. A technical effect and an implementation principle of the apparatus are similar to those of the technical solution in the method embodiment shown in FIG. 2A and FIG. 2B. Details are not described herein again.

Figure 8:
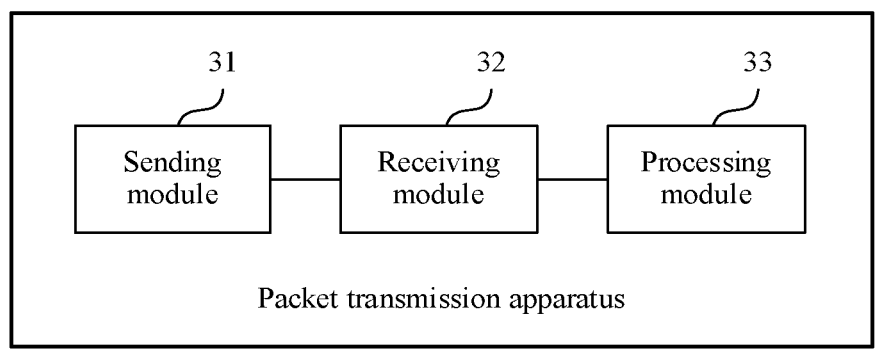
FIG. 8 is a schematic structural diagram of an embodiment of a packet transmission apparatus according to this application.

FIG. 8 is a schematic structural diagram of an embodiment of a packet transmission apparatus according to this application. As shown in FIG. 8, the apparatus in this embodiment may include a sending module 31, a receiving module 32, and a processing module 33.

The sending module 31 is configured to send a first message to a group management network element, where the first message includes an identifier of a first terminal device, an address of the first terminal device, and an identifier of a first user plane function (UPF) that provides a local area network (LAN) service for the first terminal device.

The receiving module 32 is configured to receive a first notification message sent by the group management network element, where the first notification message includes an identifier of a second UPF and an address of a second terminal device, the second terminal device and the first terminal device belong to a same local area network group, and the second UPF provides the LAN service for the second terminal device.

The processing module 33 is configured to generate a first forwarding policy based on the first notification message.

The sending module 31 is further configured to send the first forwarding policy to the first UPF, where the first forwarding policy is that when receiving a packet from the first terminal device and a destination address of the packet is the address of the second terminal device, the first UPF forwards the packet to the second UPF.

Optionally, the first forwarding policy includes the address of the second terminal device and information about the second UPF.

Optionally, the information about the second UPF includes a forwarding tunnel identifier of the second UPF. The first notification message further includes an identifier of a second SMF. The processing module 33 is further configured to:

before generating the first forwarding policy based on the first notification message, establish a forwarding tunnel between the first UPF and the second UPF, and obtain the forwarding tunnel identifier of the second UPF.

The first forwarding policy is that when receiving a packet from the first terminal device and a destination address of the packet is the address of the second terminal device, the first UPF forwards the packet to the second UPF through a forwarding tunnel identified by the forwarding tunnel identifier of the second UPF.

Optionally, the information about the second UPF includes an address of the second UPF. The processing module 33 is configured to:

before generating the first forwarding policy based on the first notification message, determine the address of the second UPF based on the identifier of the second UPF.

The first forwarding policy is that when receiving a packet from the first terminal device and a destination address of the packet is the address of the second terminal device, the first UPF forwards the packet to the second UPF indicated by the address of the second UPF.

Optionally, the information about the second UPF includes an IP address of the second UPF. The processing module 33 is configured to:

before generating the first forwarding policy based on the first notification message, determine the IP address of the second UPF based on the identifier of the second UPF.

The first forwarding policy is that when receiving a packet from the first terminal device and a destination address of the packet is the address of the second terminal device, the first UPF encapsulates the packet into an IP packet and sends the IP packet to an external network, where a destination address of the IP packet is the IP address of the second UPF, and routes, through the external network, the IP packet to the second UPF indicated by the IP address of the second UPF.

Optionally, the sending module 31 is further configured to send the first forwarding policy to the first UPF.

The apparatus in this embodiment may be configured to perform the technical solution in the method embodiment shown in FIG. 2A and FIG. 2B. An implementation principle of the apparatus is similar to that of the technical solution in the method embodiment shown in FIG. 2A and FIG. 2B. Details are not described herein again.

In this application, function modules in the packet transmission apparatus may be obtained through division based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in the embodiments of this application, module division is an example, and is merely logical function division. In an actual implementation, another division manner may be used.

Figure 9:
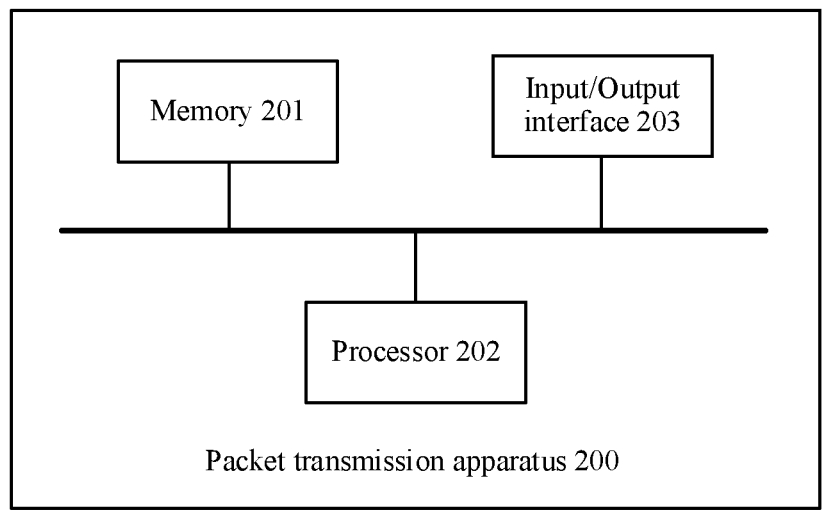
FIG. 9 is a schematic structural diagram of a packet transmission apparatus according to this application.

FIG. 9 is a schematic structural diagram of a packet transmission apparatus 200 according to this application. The packet transmission apparatus 200 includes:

a memory 201, configured to store a program instruction, where the memory 201 may be a flash (flash memory); and a processor 202, configured to invoke and execute the program instruction in the memory, to implement steps that correspond the corresponding apparatus and that are of the packet transmission method in FIG. 2A and FIG. 2B, FIG. 3A and FIG. 3B, FIG. 4, or FIG. 5. For details, refer to related descriptions in the foregoing method embodiments.

The packet transmission apparatus 200 may further include an input/output interface 203. The input/output interface 203 may include an output interface and an input interface that are independent of each other, or may be an integrated interface integrating input and output functions. The output interface is configured to output data, and the input interface is configured to obtain input data. The output data is a general term of output in the foregoing method embodiments, and the input data is a general term of input in the foregoing method embodiments.

The packet transmission apparatus 200 may be configured to perform steps and/or procedures that correspond to the corresponding apparatus and that are of the foregoing method embodiments.

This application further provides a readable storage medium. The readable storage medium stores an execution instruction. When at least one processor of a packet transmission apparatus executes the execution instruction, the packet transmission apparatus performs the packet transmission method in the foregoing method embodiments.

This application further provides a program product. The program product includes an execution instruction, and the execution instruction is stored in a readable storage medium. At least one processor of a packet transmission apparatus may read the execution instruction from the readable storage medium. The at least one processor executes the execution instruction, so that the packet transmission apparatus performs the packet transmission method in the foregoing method embodiments.

This application further provides a chip. The chip is connected to a memory, or a memory is integrated into the chip. When a software program stored in the memory is executed, the packet transmission method in the foregoing method embodiments is implemented.

This application further provides a communications system. The communications system includes one or more of a group management network element, a session management network element, and a user plane network element. The group management network element may be configured to perform the method in the foregoing method embodiment, or the method performed by the group management network element in the solutions provided in the embodiments of this application.

The session management network element may perform the method in the foregoing method embodiment, or the method performed by the session management network element in the solutions provided in the embodiments of this application.

The user plane network element may be configured to perform the method in the foregoing method embodiment, or the method performed by the user plane network element in the solutions provided in the embodiments of this application.

Optionally, the communications system may further include another device that interacts with the group management network element in the solutions provided in the embodiments of this application.

Optionally, the communications system may further include another device that interacts with the session management network element in the solutions provided in the embodiments of this application.

Optionally, the communications system may further include another device that interacts with the user plane network element in the solutions provided in the embodiments of this application.

A person of ordinary skill in the art may understand that all or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A packet transmission apparatus, comprising:
   a memory and at least one processor coupled to the memory, wherein the at least one processor is configured to execute instructions stored in the memory to cause the apparatus to:
   receive a first message sent by a first session management network element, wherein the first message comprises an address of a first terminal device and an identifier of a first user plane network element that provides a local area network (LAN) service for the first terminal device; and receive a second message sent by a second session management network element, wherein the second message comprises an address of a second terminal device and an identifier of a second user plane network element that provides the LAN service for the second terminal device;
   determine that the first terminal device and the second terminal device belong to a same LAN group; and
   send a first notification message to the first session management network element, wherein the first notification message comprises the identifier of the second user plane network element and the address of the second terminal device; and send a second notification message to the second session management network element, wherein the second notification message comprises the identifier of the first user plane network element and the address of the first terminal device.

2. The apparatus according to claim 1, wherein the first notification message further comprises an identifier of the second session management network element, and the second notification message further comprises an identifier of the first session management network element.

3. The apparatus according to claim 1, wherein the first message comprises an identifier of the first terminal device, and the second message comprises an identifier of the second terminal device; and the at least one processor is configured to execute instructions stored in the memory to cause the apparatus to determine, based on the identifier of the first terminal device and the identifier of the second terminal device, that the first terminal device and the second terminal device belong to the same LAN group.

4. A packet transmission apparatus, comprising:
   a memory and at least one processor coupled to the memory, wherein the at least one processor is configured to execute instructions stored in the memory to cause the apparatus to:
   receive a first forwarding policy from a first session management network element, wherein the first forwarding policy is used to indicate a forwarding policy of a local area network (LAN) service-related packet of a first terminal device; the first forwarding policy is that when receiving a packet from the first terminal device and a destination address of the packet is an address of a second terminal device, a first user plane network element that provides a LAN service for the first terminal device forwards the packet to a second user plane network element; and wherein the first user plane network element provides a LAN service for the first terminal device and receives a packet from the first terminal device; and
   in response to determining a destination address of the packet is the address of the second terminal device, forward the packet to the second user plane network element according to the first forwarding policy.

5. The apparatus according to claim 4, wherein the first forwarding policy comprises the address of the second terminal device and information about the second user plane network element.

6. The apparatus according to claim 5, wherein the information about the second user plane network element comprises an address of the second user plane network element, and the at least one processor is configured to execute instructions stored in the memory to cause the apparatus to:
   forward the packet to the second user plane network element indicated by the address of the second user plane network element.

7. The apparatus according to claim 5, wherein the information about the second user plane network element comprises a forwarding tunnel identifier of the second user plane network element, and the at least one processor is configured to execute instructions stored in the memory to cause the apparatus to:

forward the packet to the second user plane network element through a forwarding tunnel identified by the forwarding tunnel identifier of the second user plane network element.

8. The apparatus according to claim 5, wherein the information about the second user plane network element comprises an internet protocol (IP) address of the second user plane network element, and the at least one processor is configured to execute instructions stored in the memory to cause the apparatus to:

encapsulate the packet into an IP packet and send the IP packet to an external network, wherein a destination address of the IP packet is the IP address of the second user plane network element; and route, through the external network, the IP packet to the second user plane network element indicated by the IP address of the second user plane network element.

9. A packet transmission apparatus, comprising:

a memory and at least one processor coupled to the memory, wherein the at least one processor is configured to execute instructions stored in the memory to cause the apparatus to:

send a first message to a group management network element, wherein the first message comprises an identifier of a first terminal device, an address of the first terminal device, and an identifier of a first user plane network element that provides a local area network (LAN) service for the first terminal device;

receive a first notification message sent by the group management network element, wherein the first notification message comprises an identifier of a second user plane network element and an address of a second terminal device, the second terminal device and the first terminal device belong to a same LAN group, and the second user plane network element provides the LAN service for the second terminal device;

generate a first forwarding policy based on the first notification message; and send the first forwarding policy to the first user plane network element, wherein the first forwarding policy is that when receiving a packet from the first terminal device and a destination address of the packet is the address of the second terminal device, the first user plane network element forwards the packet to the second user plane network element.

10. The apparatus according to claim 9, wherein the first forwarding policy comprises the address of the second terminal device and information about the second user plane network element.

11. The apparatus according to claim 10, wherein the information about the second user plane network element comprises a forwarding tunnel identifier of the second user plane network element, the first notification message further comprises an identifier of a second session management network element, and the at least one processor is configured to execute instructions stored in the memory to cause the apparatus to:

before generating the first forwarding policy based on the first notification message, establish a forwarding tunnel between the first user plane network element and the second user plane network element, and obtain the forwarding tunnel identifier of the second user plane network element, wherein the first forwarding policy is that when receiving a packet from the first terminal device and a destination address of the packet is the address of the second terminal device, the first user plane network element forwards the packet to the second user plane network element through a forwarding tunnel identified by the forwarding tunnel identifier of the second user plane network element.

12. The apparatus according to claim 10, wherein the information about the second user plane network element comprises an address of the second user plane network element, and the at least one processor is configured to execute instructions stored in the memory to cause the apparatus to:

before generating the first forwarding policy based on the first notification message, determine the address of the second user plane network element based on the identifier of the second user plane network element, wherein the first forwarding policy is that when receiving a packet from the first terminal device and a destination address of the packet is the address of the second terminal device, the first user plane network element forwards the packet to the second user plane network element indicated by the address of the second user plane network element.

13. The apparatus according to claim 10, wherein the information about the second user plane network element comprises an internet protocol (IP) address of the second user plane network element, and the at least one processor is configured to execute instructions stored in the memory to cause the apparatus to:

before generating the first forwarding policy based on the first notification message, determine the IP address of the second user plane network element based on the identifier of the second user plane network element, wherein the first forwarding policy is that when receiving a packet from the first terminal device and a destination address of the packet is the address of the second terminal device, the first user plane network element encapsulates the packet into an IP packet and sends the IP packet to an external network, wherein a destination address of the IP packet is the IP address of the second user plane network element, and routes, through the external network, the IP packet to the second user plane network element indicated by the IP address of the second user plane network element.

14. The apparatus according to claim 9, wherein the at least one processor is configured to execute instructions stored in the memory to cause the apparatus to:

send the first forwarding policy to the first user plane network element.

* * * * *

UNITED STATES PATENT AND TRADEMARK OFFICE
CERTIFICATE OF CORRECTION

| | | |
|---|---|---|
| PATENT NO. | : 11,765,686 B2 | Page 1 of 1 |
| APPLICATION NO. | : 17/224339 | |
| DATED | : September 19, 2023 | |
| INVENTOR(S) | : Yuan Wang et al. | |

It is certified that error appears in the above-identified patent and that said Letters Patent is hereby corrected as shown below:

On the Title Page

Item (56), in Column 2, under "Other Publications", Line 1, delete "5GLAN" and insert
-- 5G LAN --.

Signed and Sealed this
Seventh Day of November, 2023

Katherine Kelly Vidal
*Director of the United States Patent and Trademark Office*